United States Patent
Van Tol et al.

(10) Patent No.: US 12,484,926 B2
(45) Date of Patent: Dec. 2, 2025

(54) SURGICAL INSTRUMENTS, SYSTEMS, AND METHODS INCORPORATING AN OFFSET END EFFECTOR

(71) Applicant: Covidien LP, Mansfield, MA (US)

(72) Inventors: David J. Van Tol, Boulder, CO (US); Michael B. Lyons, Boulder, CO (US); Kenneth E. Netzel, Loveland, CO (US); Dylan R. Kingsley, Broomfield, CO (US); Zachary S. Heiliger, Nederland, CO (US)

(73) Assignee: Covidien LP, Mansfield, MA (US)

( * ) Notice: Subject to any disclaimer, the term of this patent is extended or adjusted under 35 U.S.C. 154(b) by 135 days.

(21) Appl. No.: 18/559,984

(22) PCT Filed: May 2, 2022

(86) PCT No.: PCT/IB2022/054034
§ 371 (c)(1),
(2) Date: Nov. 9, 2023

(87) PCT Pub. No.: WO2022/238810
PCT Pub. Date: Nov. 17, 2022

(65) Prior Publication Data
US 2024/0382226 A1   Nov. 21, 2024

Related U.S. Application Data

(60) Provisional application No. 63/188,267, filed on May 13, 2021.

(51) Int. Cl.
*A61B 17/32* (2006.01)
*A61B 17/00* (2006.01)
*A61B 34/30* (2016.01)

(52) U.S. Cl.
CPC ...... *A61B 17/320092* (2013.01); *A61B 34/30* (2016.02); *A61B 2017/00017* (2013.01);
(Continued)

(58) Field of Classification Search
None
See application file for complete search history.

(56) References Cited

U.S. PATENT DOCUMENTS

| 5,792,135 A | 8/1998 | Madhani et al. |
| 5,897,523 A | 4/1999 | Wright et al. |

(Continued)

FOREIGN PATENT DOCUMENTS

| WO | 2021006984 A1 | 1/2021 |
| WO | 2021173294 A1 | 9/2021 |

(Continued)

OTHER PUBLICATIONS

U.S. Appl. No. 17/970,257, filed Oct. 20, 2022, Inventor: Matthew S. Cowley.

(Continued)

*Primary Examiner* — Ashley L Fishback

(57) ABSTRACT

A surgical system includes an elongated assembly and an articulation joint defined in the elongated assembly. The elongated assembly articulates about the articulation joint. The articulation joint defines a central axis and a distal side portion. An offsetting member extends from the distal side portion of the articulation joint. An end effector is supported by the offsetting member. The end effector includes a blade and a jaw member movable relative to the blade between a spaced-apart position and an approximated position for clamping tissue. The offsetting member offsets the end effector with respect to the central axis of the articulation joint. An actuation cable extends through the central axis of the articulation joint. The actuation cable is operably (Continued)

coupled to the jaw member to pivot the jaw member with respect to the blade between the spaced-apart position and the approximated position.

19 Claims, 8 Drawing Sheets

(52) U.S. Cl.
CPC .............. *A61B 2017/00199* (2013.01); *A61B 2017/00353* (2013.01); *A61B 2017/00411* (2013.01); *A61B 2017/00477* (2013.01); *A61B 2017/00738* (2013.01); *A61B 2017/320071* (2017.08); *A61B 2017/320075* (2017.08); *A61B 2017/320094* (2017.08)

(56) References Cited

U.S. PATENT DOCUMENTS

| | | |
|---|---|---|
| 7,135,030 B2 | 11/2006 | Schwemberger et al. |
| 10,172,636 B2 | 1/2019 | Stulen et al. |
| 10,226,274 B2 | 3/2019 | Worrell et al. |
| 10,258,363 B2 | 4/2019 | Worrell et al. |
| 10,335,182 B2 | 7/2019 | Stulen et al. |
| 10,405,876 B2 | 9/2019 | Boudreaux |
| 10,413,316 B2 | 9/2019 | Lyons |
| 10,492,819 B2 | 12/2019 | Hibner |
| 10,575,836 B2 | 3/2020 | Hibner et al. |
| 10,912,581 B2 | 2/2021 | Stulen et al. |
| 10,925,630 B2 | 2/2021 | Cuti et al. |
| 10,987,123 B2 | 4/2021 | Weir et al. |
| 11,337,717 B2 | 5/2022 | Lyons |
| 2006/0058825 A1 | 3/2006 | Ogura et al. |
| 2006/0190034 A1 | 8/2006 | Nishizawa et al. |
| 2008/0214967 A1 | 9/2008 | Aranyi et al. |
| 2009/0163948 A1 | 6/2009 | Sunaoshi et al. |
| 2013/0012959 A1 | 1/2013 | Jinno |
| 2013/0140835 A1 | 6/2013 | Stefanchik |
| 2014/0005701 A1 | 1/2014 | Olson et al. |
| 2014/0005702 A1 | 1/2014 | Timm et al. |
| 2014/0114334 A1 | 4/2014 | Olson et al. |
| 2014/0276931 A1 | 9/2014 | Parihar et al. |
| 2014/0309562 A1 | 10/2014 | Ito |
| 2014/0350570 A1 | 11/2014 | Lee |
| 2015/0080924 A1 | 3/2015 | Stulen et al. |
| 2016/0302812 A1 | 10/2016 | Monroe et al. |
| 2017/0245875 A1 | 8/2017 | Richard et al. |
| 2019/0021752 A1 | 1/2019 | Boudreaux |
| 2019/0021756 A1 | 1/2019 | Boudreaux |
| 2019/0133635 A1 | 5/2019 | Stulen et al. |
| 2019/0216493 A1 | 7/2019 | Worrell et al. |
| 2019/0231385 A1 | 8/2019 | Cowley |
| 2019/0247083 A1 | 8/2019 | Worrell et al. |
| 2019/0290318 A1 | 9/2019 | Boudreaux |
| 2019/0321068 A1 | 10/2019 | Hibner et al. |
| 2019/0321069 A1 | 10/2019 | Hibner |
| 2019/0321070 A1 | 10/2019 | Boudreaux |
| 2019/0380735 A1 | 12/2019 | Cuti et al. |
| 2020/0229833 A1 | 7/2020 | Vakharia et al. |
| 2020/0229834 A1 | 7/2020 | Olson et al. |
| 2020/0237397 A1 | 7/2020 | Boudreaux |
| 2020/0237399 A1 | 7/2020 | Stulen et al. |
| 2021/0353324 A1 | 11/2021 | Fagan et al. |
| 2021/0353325 A1 | 11/2021 | Fagan et al. |
| 2021/0369295 A1 | 12/2021 | Cowley |
| 2022/0249110 A1 | 8/2022 | Lyons |
| 2023/0095787 A1 | 3/2023 | Fagan et al. |

FOREIGN PATENT DOCUMENTS

| | | |
|---|---|---|
| WO | 2021178103 A1 | 9/2021 |
| WO | 2021202035 A1 | 10/2021 |

OTHER PUBLICATIONS

EP Communication for corresponding EP Application No. 22 723 200.6 mailed Nov. 25, 2024 (5 pages).

US 12,484,926 B2

SURGICAL INSTRUMENTS, SYSTEMS, AND METHODS INCORPORATING AN OFFSET END EFFECTOR

CROSS-REFERENCE TO RELATED APPLICATION

This application is a 371 National Stage Application of International Application No. PCT/IB2022/054034, filed May 2, 2022, which claims the benefit of, and priority to, U.S. Provisional Patent Application No. 63/188,267, filed on May 13, 2021, the entire contents of each of which are hereby incorporated herein by reference.

FIELD

The present disclosure relates to energy-based surgical instruments and, more particularly, to surgical instruments, systems, and methods incorporating an offset end effector.

BACKGROUND

Surgical instruments and systems incorporating ultrasonic functionality utilize ultrasonic energy, i.e., ultrasonic vibrations, to treat tissue. More specifically, mechanical vibration energy transmitted at ultrasonic frequencies can be utilized to treat, e.g., seal and transect, tissue. A surgical instrument incorporating ultrasonic functionality may include, for example, an ultrasonic blade and a clamp mechanism to enable clamping of tissue against the blade. Ultrasonic energy transmitted to the blade causes the blade to vibrate at very high frequencies, which allows for heating tissue to treat tissue clamped against or otherwise in contact with the blade.

SUMMARY

Provided in accordance with aspects of the disclosure is a surgical system including an elongated assembly and an articulation joint defined in the elongated assembly. The elongated assembly articulates about the articulation joint. The articulation joint defines a central axis and a distal side portion. An offsetting member extends from the distal side portion of the articulation joint. An end effector is supported by the offsetting member. The end effector includes a blade and a jaw member movable relative to the blade between a spaced-apart position and an approximated position for clamping tissue. The offsetting member offsets the end effector with respect to the central axis of the articulation joint. An actuation cable extends through the articulation joint. The actuation cable is operably coupled to the jaw member to pivot the jaw member with respect to the blade between the spaced-apart position and the approximated position.

According to aspects of the disclosure, the elongated assembly defines a lumen. The actuation cable extends through the lumen of the elongated assembly.

According to aspects of the disclosure, the actuation cable extends along a central axis of the lumen. The central axis of the lumen is aligned with the central axis of the articulation joint.

According to aspects of the disclosure, the articulation joint includes a housing and an ultrasonic transducer arranged in the housing. The ultrasonic transducer transmits ultrasonic mechanical motion to the blade.

According to aspects of the disclosure, the housing is positioned on the distal side portion of the articulation joint.

According to aspects of the disclosure, an ultrasonic waveguide interconnects the ultrasonic transducer with the blade.

According to aspects of the disclosure, the ultrasonic waveguide extends through the offsetting member.

According to aspects of the disclosure, a housing is disposed at a distal side of the offsetting member and an ultrasonic transducer is arranged in the housing. The ultrasonic transducer transmits ultrasonic mechanical motion to the blade.

According to aspects of the disclosure, the jaw member or the blade is connected to a source of electrosurgical energy for communicating electrosurgical energy to tissue clamped between the blade and the jaw member.

According to aspects of the disclosure, the blade defines a longitudinal axis along the blade. A shape of the blade may be asymmetric with respect to the longitudinal axis of the blade.

According to aspects of the disclosure, the end effector defines a central axis defining a first side and a second side of the central axis. A position of the blade is biased toward the first side or the second side of the central axis of the end effector.

According to aspects of the disclosure, the end effector defines an upper side and a lower side. The blade is offset toward the upper side of the end effector.

BRIEF DESCRIPTION OF THE DRAWINGS

The above and other aspects and features of the present disclosure will become more apparent in light of the following detailed description when taken in conjunction with the accompanying drawings.

DETAILED DESCRIPTION

Figure 1:
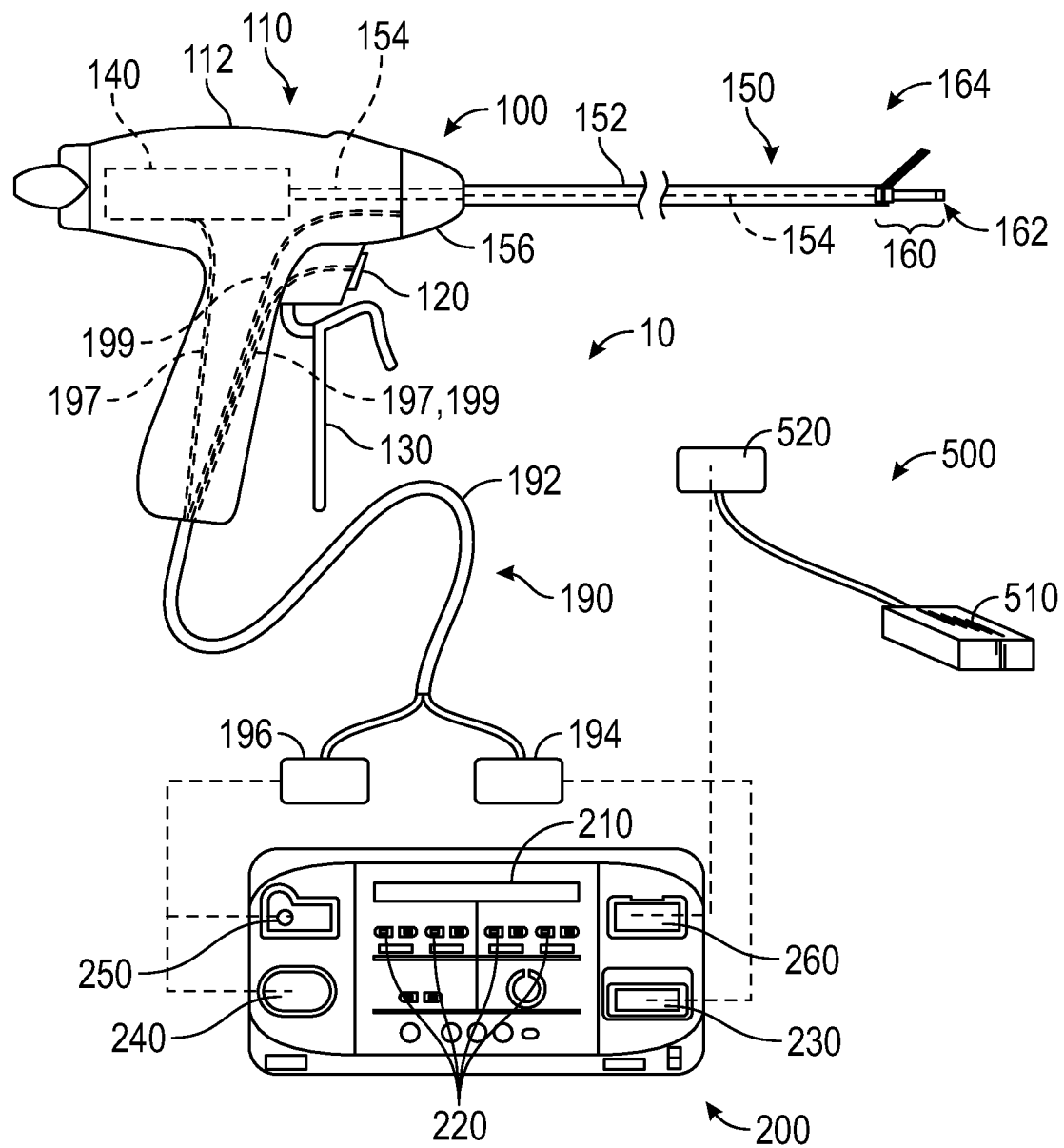
FIG. 1 is a side view of a surgical system provided in accordance with the present disclosure including a surgical instrument, a surgical generator, and a return electrode device.

As used herein, the term "distal" refers to the portion that is being described which is further from an operator (whether a human surgeon or a surgical robot), while the term "proximal" refers to the portion that is being described which is closer to an operator. Further, to the extent consistent, any of the aspects and features detailed herein may be used in conjunction with any or all of the other aspects and features detailed herein.

Descriptions of technical features or aspects of an exemplary configuration of the disclosure should typically be considered as available and applicable to other similar features or aspects in another exemplary configuration of the disclosure. Accordingly, technical features described herein according to one exemplary configuration of the disclosure may be applicable to other exemplary configurations of the disclosure, and thus duplicative descriptions may be omitted herein.

Exemplary configurations of the disclosure will be described more fully below (e.g., with reference to the accompanying drawings). Like reference numerals may refer to like elements throughout the specification and drawings.

Referring to FIG. 1, a surgical system provided in accordance with aspects of the present disclosure is shown generally identified by reference numeral 10 including a surgical instrument 100, a surgical generator 200, and, in some aspects, a return electrode device 500, e.g., including a return pad 510. Surgical instrument 100 includes a handle assembly 110, an elongated assembly 150 extending distally from handle assembly 110, an end effector assembly 160 disposed at a distal end of elongated assembly 150, and a cable assembly 190 operably coupled with handle assembly 110 and extending therefrom for connection to surgical generator 200.

Surgical generator 200 includes a display 210, a plurality user interface features 220, e.g., buttons, touch screens, switches, etc., an ultrasonic plug port 230, a bipolar electrosurgical plug port 240, and active and return monopolar electrosurgical plug ports 250, 260, respectively. As an alternative to plural dedicated ports 230-260, one or more common ports (not shown) may be configured to act as any two or more of ports 230-260.

Surgical instrument 100 is configured to operate in one or more electrosurgical modes supplying Radio Frequency (RF) energy to tissue to treat tissue, e.g., a monopolar configuration and/or a bipolar configuration, and an ultrasonic mode supplying ultrasonic energy to tissue to treat tissue. The modes may operate simultaneously, sequentially, or in any other suitable manner. Surgical generator 200 is configured to produce ultrasonic drive signals for output through ultrasonic plug port 230 to surgical instrument 100 to activate surgical instrument 100 in the ultrasonic mode and to provide electrosurgical energy, e.g., RF bipolar energy for output through bipolar electrosurgical plug port 240 and/or RF monopolar energy for output through active monopolar electrosurgical port 250 to surgical instrument 100 to activate surgical instrument 100 in the one or more electrosurgical modes. Plug 520 of return electrode device 500 is configured to connect to return monopolar electrosurgical plug port 260 to return monopolar electrosurgical energy from surgical instrument 100 in the monopolar electrosurgical mode. In other aspects, the electrosurgical functionality (and associated components and configurations) of surgical instrument 100 may be omitted such that surgical instrument 100 operates only in an ultrasonic mode.

Continuing with reference to FIG. 1, handle assembly 110 includes a housing 112, an activation button 120, and a clamp trigger 130. Housing 112 is configured to support an ultrasonic transducer 140. Ultrasonic transducer 140 may be permanently engaged within housing 112 or removable therefrom. Ultrasonic transducer 140 includes a piezoelectric stack other suitable ultrasonic transducer components electrically coupled to surgical generator 200, e.g., via one or more of first electrical lead wires 197, to enable communication of ultrasonic drive signals to ultrasonic transducer 140 to drive ultrasonic transducer 140 to produce ultrasonic vibration energy that is transmitted along a waveguide 154 of elongated assembly 150 to blade 162 of end effector assembly 160 of elongated assembly 150, as detailed below. Feedback and/or control signals may likewise be communicated between ultrasonic transducer 140 and surgical generator 200. Ultrasonic transducer 140, more specifically, and as detailed below, may include a stack of piezoelectric elements secured, under pre-compression between proximal and distal end masses or a proximal end mass and an ultrasonic horn with first and second electrodes electrically coupled between piezoelectric elements of the stack of piezoelectric elements to enable energization thereof to produce ultrasonic energy. However, other suitable ultrasonic transducer configurations, including plural transducers and/or non-longitudinal, e.g., torsional, transducers are also contemplated.

An activation button 120 is disposed on housing 112 and coupled to or between ultrasonic transducer 140 and/or surgical generator 200, e.g., via one or more of first electrical lead wires 197, to enable activation of ultrasonic transducer 140 in response to depression of activation button 120. In some configurations, activation button 120 may include an ON/OFF switch. In other configurations, activation button 120 may include multiple actuation switches to enable activation from an OFF position to different actuated positions corresponding to different activation settings, e.g., a first actuated position corresponding to a first activation setting (such as a LOW power or tissue sealing setting) and a second actuated position corresponding to a second activation setting (such as a HIGH power or tissue transection setting). In still other configurations, separate activation buttons may be provided, e.g., a first actuation button for activating a first activation setting and a second activation button for activating a second activation setting. Additional activation buttons, sliders, wheels, etc. are also contemplated to enable control of various different activation settings from housing 112.

Elongated assembly 150 of surgical instrument 100 includes an outer drive sleeve 152, a waveguide 154, a rotation knob 156, and an end effector assembly 160 including a blade 162 and a jaw member 164. Rotation knob 156 is rotatable in either direction to rotate elongated assembly 150 in either direction relative to handle assembly 110. The drive assembly operably couples a proximal portion of outer drive sleeve 152 to clamp trigger 130 of handle assembly 110. A distal portion of outer drive sleeve 152 is operably coupled to jaw member 164. Advancing the outer drive sleeve 152 actuates the jaw member 164 between open and clamped configurations. Other suitable drive structures as opposed to a sleeve are also contemplated such as, for example, drive rods, drive cables, drive screws, etc.

Referring still to FIG. 1, the drive assembly may be tuned to provide a jaw clamping force, or jaw clamping force within a jaw clamping force range, to tissue clamped between jaw member 164 and blade 162 or may include a force limiting feature whereby the clamping force applied to tissue clamped between jaw member 164 and blade 162 is limited to a particular jaw clamping force or a jaw clamping force within a jaw clamping force range.

Waveguide 154 includes blade 162 disposed at a distal end thereof. Blade 162 may be integrally formed with waveguide 154, separately formed and subsequently attached (permanently or removably) to waveguide 154, or otherwise operably coupled with waveguide 154. Waveguide 154 and/or blade 162 may be formed from titanium, a titanium alloy, or other suitable electrically conductive material(s), although non-conductive materials are also contemplated. Waveguide 154 includes a proximal connector (not shown), e.g., a threaded male connector, configured for engagement, e.g., threaded engagement within a threaded female receiver, of ultrasonic transducer 140 such that ultrasonic motion produced by ultrasonic transducer 140 is transmitted along waveguide 154 to blade 162 for treating tissue clamped between blade 162 and jaw member 164 or positioned adjacent to blade 162.

Cable assembly 190 of surgical instrument 100 includes a cable 192, an ultrasonic plug 194, and an electrosurgical plug 196. Ultrasonic plug 194 is configured for connection with ultrasonic plug port 230 of surgical generator 200 while electrosurgical plug 196 is configured for connection with bipolar electrosurgical plug port 240 of surgical generator 200 and/or active monopolar electrosurgical plug port 250 of surgical generator 200. In configurations where generator 200 includes a common port, cable assembly 190 may include a common plug (not shown) configured to act as both the ultrasonic plug 194 and the electrosurgical plug 196. In configurations where surgical instrument 100 is only configured for ultrasonic operation, electrosurgical plug 196 and associated components are omitted.

Plural first electrical lead wires 197 electrically coupled to ultrasonic plug 194 extend through cable 192 and into handle assembly 110 for electrical connection to ultrasonic transducer 140 and/or activation button 120 to enable the selective supply of ultrasonic drive signals from surgical generator 200 to ultrasonic transducer 140 upon activation of activation button 120 in an ultrasonic mode. In addition, and where electrosurgical functionality is provided, plural second electrical lead wires 199 are electrically coupled to electrosurgical plug 196 and extend through cable 192 into handle assembly 110. In bipolar configurations, separate second electrical lead wires 199 are electrically coupled to waveguide 154 and jaw member 164 (and/or different portions of jaw member 164) such that bipolar electrosurgical energy may be conducted between blade 162 and jaw member 164 (and/or between different portions of jaw member 164). In monopolar configurations, a second electrical lead wire 199 is electrically coupled to waveguide 154 such that monopolar electrosurgical energy may be supplied to tissue from blade 162. Alternatively, or additionally, a second electrical lead wire 199 may electrically couple to jaw member 164 in the monopolar configuration to enable monopolar electrosurgical energy to be supplied to tissue from jaw member 164. In configurations where both bipolar and monopolar functionality are enabled, one or more of the second electrical lead wires 199 may be used for both the delivery of bipolar energy and monopolar energy; alternatively, bipolar and monopolar energy delivery may be provided by separate second electrical lead wires 199. One or more other second electrical lead wires 199 is electrically coupled to activation button 120 to enable the selective supply of electrosurgical energy from surgical generator 200 to waveguide 154 and/or jaw member 164 upon activation of activation button 120 in an electrosurgical mode.

Figure 2:
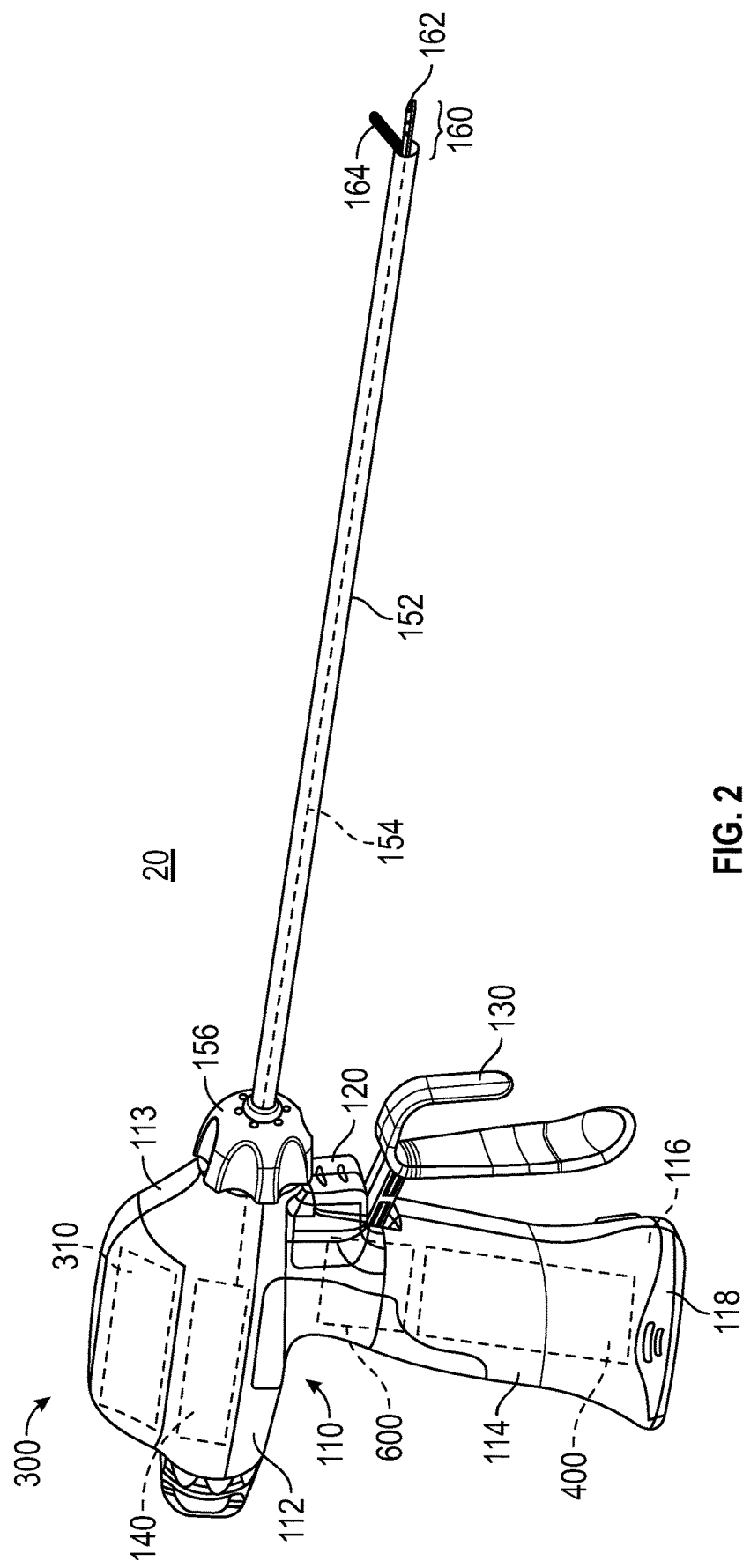
FIG. 2 is a perspective view of another surgical system provided in accordance with the present disclosure including a surgical instrument incorporating an ultrasonic generator, electrosurgical generator, and power source therein.

As an alternative to a remote generator 200, surgical system 10 may be at least partially cordless in that it incorporates an ultrasonic generator, an electrosurgical generator, and/or a power source, e.g., a battery, thereon or therein. In this manner, the connections from surgical instrument 100 to external devices, e.g., generator(s) and/or power source(s), is reduced or eliminated. More specifically, with reference to FIG. 2, another surgical system in accordance with the present disclosure is shown illustrated as a surgical instrument 20 supporting an ultrasonic generator 310, a power source (e.g., battery assembly 400), and an electrosurgical generator 600 thereon or therein. Surgical instrument 20 is similar to surgical instrument 100 (FIG. 1) and may include any of the features thereof except as explicitly contradicted below. Accordingly, only differences between surgical instrument 20 and surgical instrument 100 (FIG. 1) are described in detail below while similarities are omitted or summarily described.

Housing 112 of surgical instrument 20 includes a body portion 113 and a fixed handle portion 114 depending from body portion 113. Body portion 113 of housing 112 is configured to support an ultrasonic transducer and generator assembly ("TAG") 300 including ultrasonic generator 310 and ultrasonic transducer 140. TAG 300 may be permanently engaged with body portion 113 of housing 112 or removable therefrom.

Fixed handle portion 114 of housing 112 defines a compartment 116 configured to receive battery assembly 400 and electrosurgical generator 600 and a door 118 configured to enclose compartment 116. An electrical connection assembly (not shown) is disposed within housing 112 and serves to electrically couple activation button 120, ultrasonic generator 310 of TAG 300, and battery assembly 400 with one another when TAG 300 is supported on or in body portion 113 of housing 112 and battery assembly 400 is disposed within compartment 116 of fixed handle portion 114 of housing 112, thus enabling activation of surgical instrument 20 in an ultrasonic mode in response to appropriate actuation of activation button 120. Further, the electrical connection assembly or a different electrical connection assembly disposed within housing 112 serves to electrically couple activation button 120, electrosurgical generator 600, battery assembly 400, and end effector assembly 160 (e.g., blade 162 and jaw member 164 and/or different portions of jaw member 164) with one another when electrosurgical generator 600 and battery assembly 400 are disposed within compartment 116 of fixed handle portion 114 of housing 112, thus enabling activation of surgical instrument 20 in an electrosurgical mode, e.g., bipolar RF, in response to appropriate actuation of activation button 120. For a monopolar electrosurgical mode, return electrode device 500 (FIG. 1) may be configured to connect to surgical instrument 20 (electrosurgical generator 600 thereof, more specifically), to complete a monopolar circuit through tissue and between surgical instrument 30 (e.g., blade 162 and/or jaw member 164) and return electrode device 500 (FIG. 1).

Figure 3A:
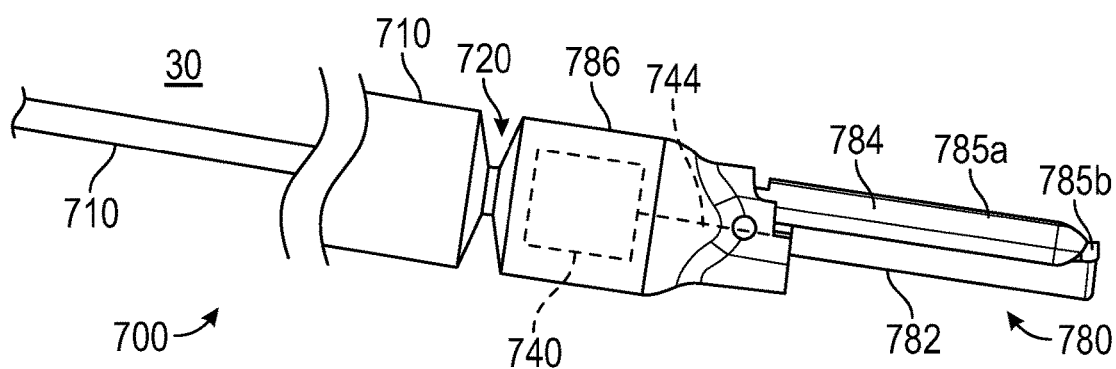
FIGS. 3A and 3B are perspective views of a distal portion of another surgical instrument provided in accordance with the present disclosure with a distal end portion thereof enlarged and an end effector assembly thereof disposed in un-articulated and articulated positions, respectively.
Figure 3B:
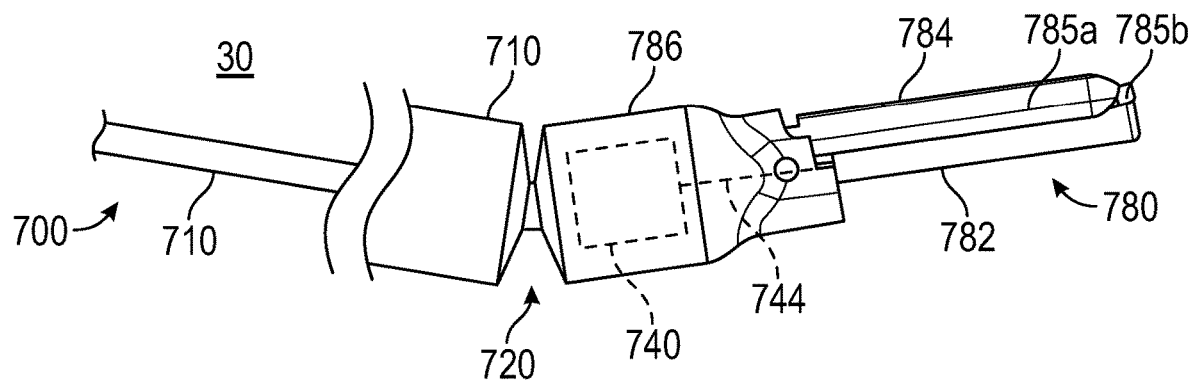

With reference to FIGS. 3A and 3B, a distal portion of another surgical instrument 30 provided in accordance with the present disclosure is shown. Surgical instrument 30 may be configured similar to and include any of the features of surgical instrument 100 (for use with a remote generator 200 as part of system 10) (FIG. 1) or surgical instrument 20

(including ultrasonic and electrosurgical generators 310, 600 and a battery assembly 400 thereon or therein) (FIG. 2), except as explicitly contradicted below. Accordingly, only differences between surgical instrument 30 and surgical instruments 100, 20 (FIGS. 1 and 2, respectively) are described in detail below while similarities are omitted or summarily described.

Surgical instrument 30 includes a housing (not shown, for manual manipulation or attachment to a surgical robot) and an elongated assembly 700 extending distally from the housing. Elongated assembly 700 of surgical instrument 30 includes an elongated shaft 710 having one or more articulating portions 720, an ultrasonic transducer 740, and an end effector assembly 780 including a blade 782, a jaw member 784, and a distal housing 786.

Elongated shaft 710, as noted above, extends distally from the housing. The one or more articulating portions 720 are disposed along at least a portion of elongated shaft 710. More specifically, an articulating portion 720 is shown in FIGS. 3A and 3B in the form of an articulating joint disposed at a distal end portion of elongated shaft 710 and coupled to distal housing 786 of end effector assembly 780 such that articulation of articulating portion 720 relative to a longitudinal axis of elongated shaft 710 articulates end effector assembly 780 relative to the longitudinal axis of elongated shaft 710. However, it is also contemplated that additional or alternative articulating portions may be disposed along some or all of elongated shaft 710 periodically, intermittently, or continuously (for a portion or the entirety of elongated shaft 710). Each articulating portion 720 may include one or more articulation joints, linkages, flexible portions, malleable portions, and/or other suitable articulating structures to enable articulation of end effector assembly 780 relative to the longitudinal axis of elongated shaft 710 in at least one direction, e.g., pitch articulation and/or yaw articulation. In configurations, the one or more articulating portions 720 are configured to enable both pitch articulation and yaw articulation; in other configurations, unlimited articulation in any direction is enabled.

Jaw member 784 is pivotably mounted on and extends distally from distal housing 786. A drive assembly (not shown) of surgical instrument 30 operably couples the actuator, e.g., clamp trigger 130 (FIG. 1), with jaw member 784 of end effector assembly 780 by way of a jaw drive (not shown) such that the actuator is selectively actuatable to pivot jaw member 784 relative to distal housing 786 and blade 782 of end effector assembly 780 from an open position to a clamping position for clamping tissue between jaw member 784 and blade 782. The jaw drive may include one or more drive shafts, drive sleeves, drive cables, gears, cams, and/or other suitable components. Jaw member 784 includes a more-rigid structural body 785a, which is pivotably mounted on a distal end portion of distal housing 786, and a more-compliant jaw liner 785b, which is captured by the more-rigid structural body 785b and positioned to oppose blade 782 to enable clamping of tissue therebetween.

In configurations where surgical instrument 30 also includes electrosurgical functionality (e.g., bipolar RF and/or monopolar RF), electrical lead wires (not shown) extend through elongated shaft 710 and articulating portion 720 to electrically coupled to ultrasonic horn 744 or blade 782, and/or to jaw member 784 such that bipolar electrosurgical energy may be conducted between blade 782 and jaw member 784 (and/or between different portions of jaw member 784) and/or such that monopolar electrosurgical energy may be supplied to tissue from blade 782 and/or jaw member 784.

An articulation assembly (not shown) including gears, pulleys, sleeves, cables, etc. operably couples a proximal articulation actuator (not shown) with articulating portion 720 such that actuation of the proximal articulation actuator manipulates articulating portion 720 to thereby articulate end effector assembly 780 relative to the longitudinal axis of elongated shaft 710.

Continuing with reference to FIGS. 3A and 3B, an ultrasonic transducer 740 is disposed within distal housing 786 and positioned distally of articulating portion 720, an ultrasonic horn 744 extends distally from ultrasonic transducer 740, and blade 782 extends distally from ultrasonic horn 744. Thus, in contrast to surgical instruments 100, 20 (FIGS. 1 and 2, respectively), ultrasonic transducer 740 is disposed within distal housing 786 distally of articulating portion 720 rather than proximally in the housing of the instrument. Alternatively, ultrasonic transducer 740 may be positioned proximally of articulating portion 720 (in the housing or otherwise positioned), and a waveguide (not shown) including one or more articulating portions, e.g., flexible portions, joint portions, linkage portions, etc., may extend through articulating portion 720 and interconnect ultrasonic transducer 740 with blade 782 such that ultrasonic energy produced by ultrasonic transducer 740 can be transmitted along the waveguide to blade 782 regardless of the articulation of articulating portion 720.

In some configurations, distal housing 786, including ultrasonic transducer 740 therein, defines an outer diameter less than about 15 mm, less than about 12 mm, less than about 10 mm, less than about 8 mm, less than about 5 mm, or less than about 3 mm. As such, ultrasonic transducer 740, in such configurations, may define a sufficiently small diameter (for example, 10% less than the diameters above) so as to enable operable receipt within distal housings 786 of the above-noted dimensions, respectively. By providing a configuration with the above-noted outer diameters, surgical instrument 30 may be utilized minimally-invasively through standard sizes of access devices. Ultrasonic transducer 740, other than its overall size, may be configured similar to ultrasonic transducer 140 (FIG. 1) or any other suitable ultrasonic transducer. For example, ultrasonic transducer 740 may include a stack of piezoelectric elements secured, under pre-compression between a proximal end mass and ultrasonic horn 744 with first and second electrodes electrically coupled between piezoelectric elements of the stack of piezoelectric elements to enable energization thereof to produce ultrasonic energy. Electrical lead wires (not shown) connect the electrodes of ultrasonic transducer 740 with an ultrasonic generator (not shown) to enable an electrical drive signal generated by the ultrasonic generator to be imparted to the stack of piezoelectric elements of ultrasonic transducer 740 to energize the stack of piezoelectric elements to produce ultrasonic energy for transmission to blade 782 via ultrasonic horn 744.

Figure 4A:
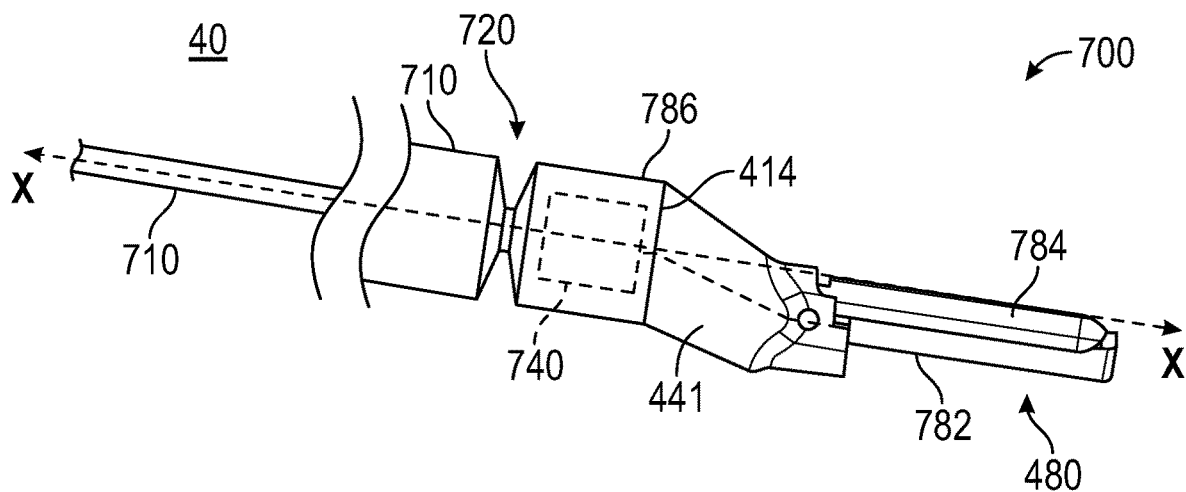
FIGS. 4A and 4B are perspective views of a distal portion of another surgical instrument provided in accordance with the present disclosure with a distal end portion thereof enlarged and an end effector assembly thereof including an offsetting member.
Figure 4B:
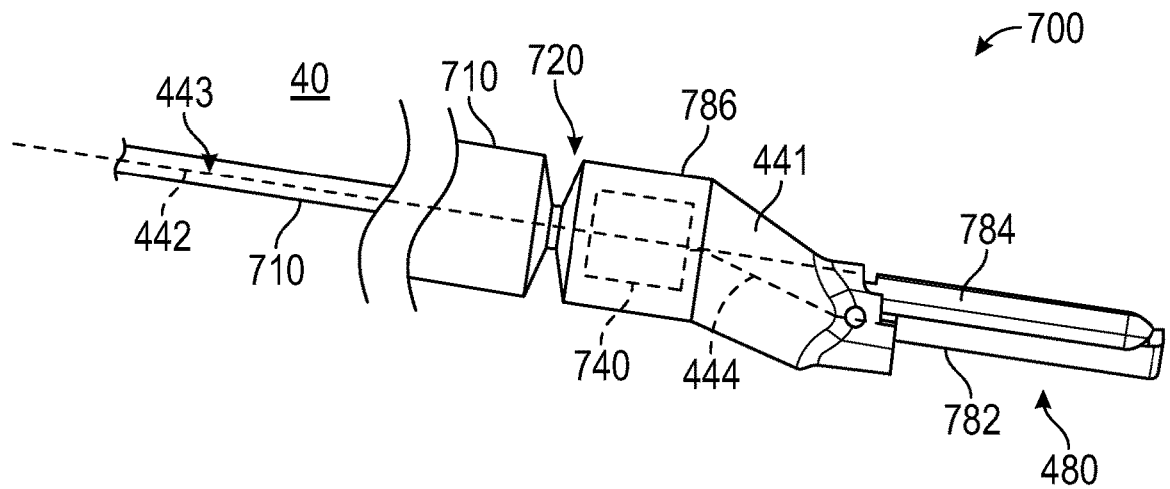
Figure 4C:
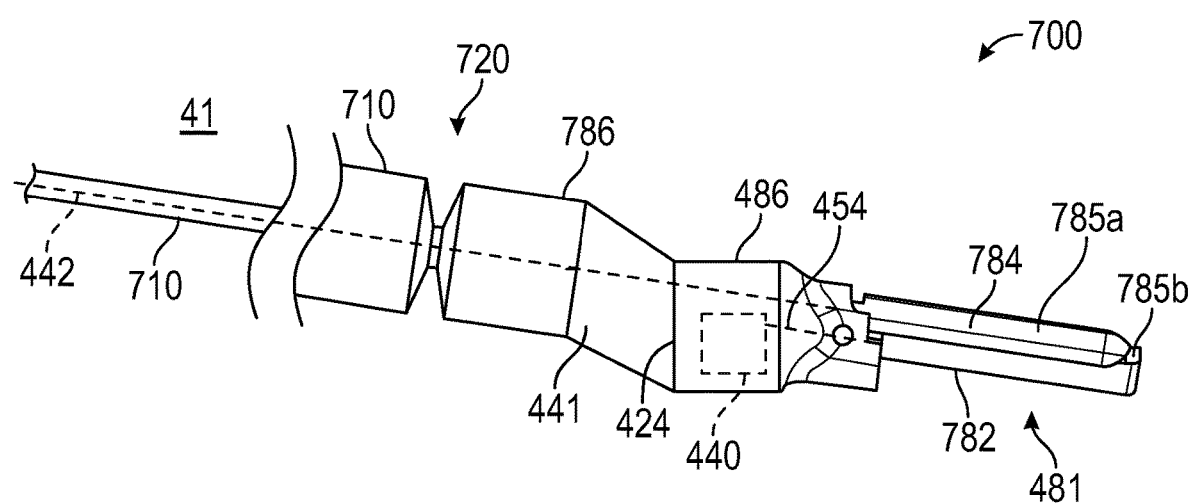
FIG. 4C is a perspective view of a distal portion of another surgical instrument provided in accordance with the present disclosure with a distal end portion thereof enlarged and an end effector assembly thereof including an offsetting member.

Referring to FIGS. 4A-4C, surgical instrument 40 includes elongated assembly 700 including elongated shaft 710 and at least one articulation joint 720 defined in the elongated assembly 700. The elongated assembly 700 articulates about the articulation joint 720. The articulation joint 720 defines a central axis X-X (FIG. 4A) and a distal end portion 414. An offsetting member 441 extends from the distal end portion 414 of the articulation joint 720. An end effector 480 is supported by the offsetting member 441. The end effector 480 includes blade 782 and jaw member 784 movable relative to the blade 782 between a spaced-apart position and an approximated position for clamping tissue.

The offsetting member 441 offsets the end effector 480 with respect to the central axis X-X of the articulation joint 720. An actuation cable 442 (FIG. 4B) extends along the central axis X-X of the at least one articulation joint 720 such that the actuation cable 442 (FIG. 4B) is substantially unaffected by articulation of end effector 480 (and, thus, such that the position of jaw member 784 is substantially unaffected by the articulated (or un-articulated) position of end effector 480). The actuation cable 442 is operably coupled to the jaw member 784 to pivot the jaw member 784 with respect to the blade 782 between the spaced-apart position and the approximated position. Offsetting the end effector assembly 480 with respect to the central axis X-X of the articulation joint 720 provides a path extending along the central axis X-X, for actuation cable 442 (FIG. 4B) without interference from ultrasonic transducer 740. In aspects, the end effector assembly 480 may be offset such that the coupling location between the actuation cable 442 and the jaw member 784 (e.g., the location where a drive pin 155 engaged with the actuation cable 442 is received within apertures 183b defined within proximal flanges 183a of the jaw member 784 (as described below with reference to FIG. 6)), is aligned on the central axis X-X. This offset also allows surgical instrument 40 to be snaked through a trocar, and increases visibility of blade 782 and jaw member 784 during use.

In aspects of the present disclosure, the elongated assembly 700 defines a lumen 443. The actuation cable 442 extends through the lumen 443 of the elongated assembly 700. For example, the actuation cable 442 may extend through a central axis of the lumen 443 (see, e.g., axis X-X in FIG. 4A extending through the central axis of the articulation joint 720 and the central axis of the lumen 443).

The articulation joint includes a housing (see, e.g., housing 786 in FIG. 4A or housing 486 in FIG. 4C) and an ultrasonic transducer (see, e.g., ultrasonic transducer 740 in FIG. 4A or ultrasonic transducer 440 in FIG. 4C) arranged in the housing. The ultrasonic transducer transmits ultrasonic mechanical motion to the blade 782.

Referring particularly to FIG. 4B, in surgical instrument 40 housing 786 is positioned between the articulation joint 720 and the offsetting member 441. Waveguide 444 extends from ultrasonic transducer 740 arranged in housing 786 through the elongated member 441 and to blade 782.

Referring particularly to FIG. 4C, in surgical instrument 41 including end effector 481, housing 486 is positioned on a distal side 424 of offsetting member 441. Waveguide 454 extends from ultrasonic transducer 440 arranged in housing 486 to blade 782.

Offsetting member 441, in any of the above configurations, may be a substantially rigid housing, sleeve, frame, or other suitable component to provide the above-detailed offset while still enabling electrical and mechanical connections therethrough. In aspects, the offset is fixed.

Figure 5:
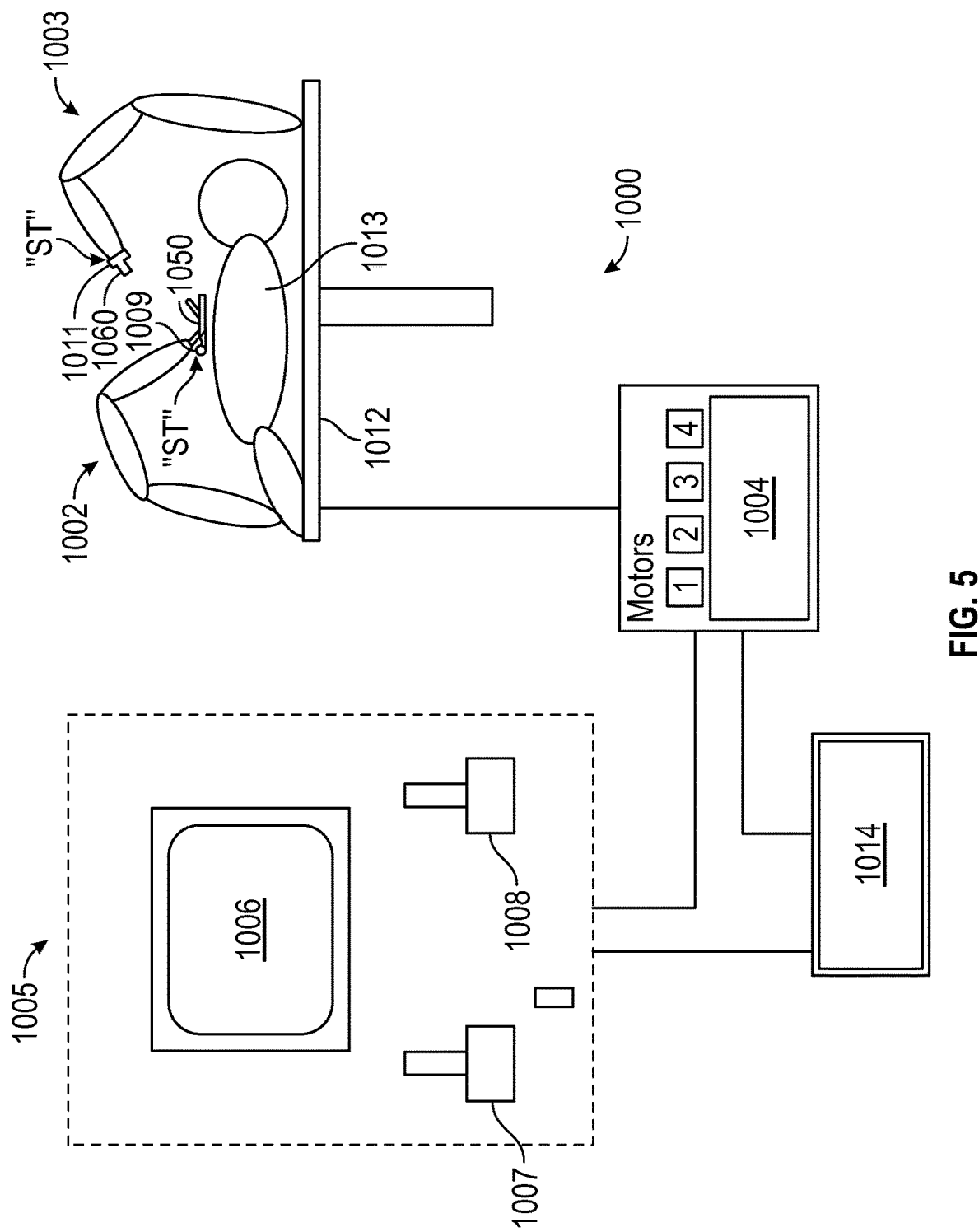
FIG. 5 is a schematic illustration of a robotic surgical system provided in accordance with the present disclosure.

Turning to FIG. 5, a robotic surgical system in accordance with the aspects and features of the present disclosure is shown generally identified by reference numeral 1000. For the purposes herein, robotic surgical system 1000 is generally described. Aspects and features of robotic surgical system 1000 not germane to the understanding of the present disclosure are omitted to avoid obscuring the aspects and features of the present disclosure in unnecessary detail.

Robotic surgical system 1000 generally includes a plurality of robot arms 1002, 1003; a control device 1004; and an operating console 1005 coupled with control device 1004. Operating console 1005 may include a display device 1006, which may be set up in particular to display three dimensional images; and manual input devices 1007, 1008, by means of which a person (not shown), for example a surgeon, may be able to telemanipulate robot arms 1002, 1003 in a first operating mode. Robotic surgical system 1000 may be configured for use on a patient 1013 lying on a patient table 1012 to be treated in a minimally invasive manner. Robotic surgical system 1000 may further include a database 1014, in particular coupled to control device 1004, in which are stored, for example, pre-operative data from patient 1013 and/or anatomical atlases.

Each of the robot arms 1002, 1003 may include a plurality of members, which are connected through joints, and an attaching device 1009, 1011, to which may be attached, for example, a surgical tool "ST" supporting an end effector 1050, 1060. One of the surgical tools "ST" may be surgical instrument 100 (FIG. 1), surgical instrument 20 (FIG. 2), surgical instrument 30 (FIGS. 3A and 3B), surgical instrument 40 (FIGS. 4A and 4B), or surgical instrument 41 (FIG. 4C), e.g., configured for use in both an ultrasonic mode and one or more electrosurgical (bipolar and/or monopolar) modes, wherein manual actuation features, e.g., actuation button 120 (FIG. 1), clamp lever 130 (FIG. 1), the proximal articulation actuator, etc., are replaced with robotic inputs. In such configurations, robotic surgical system 1000 may include or be configured to connect to an ultrasonic generator, an electrosurgical generator, and/or a power source. The other surgical tool "ST" may include any other suitable surgical instrument, e.g., an endoscopic camera, other surgical tool, etc. Robot arms 1002, 1003 may be driven by electric drives, e.g., motors, that are connected to control device 1004. Control device 1004 (e.g., a computer) may be configured to activate the motors, in particular by means of a computer program, in such a way that robot arms 1002, 1003, their attaching devices 1009, 1011, and, thus, the surgical tools "ST" execute a desired movement and/or function according to a corresponding input from manual input devices 1007, 1008, respectively. Control device 1004 may also be configured in such a way that it regulates the movement of robot arms 1002, 1003 and/or of the motors.

Figure 6:
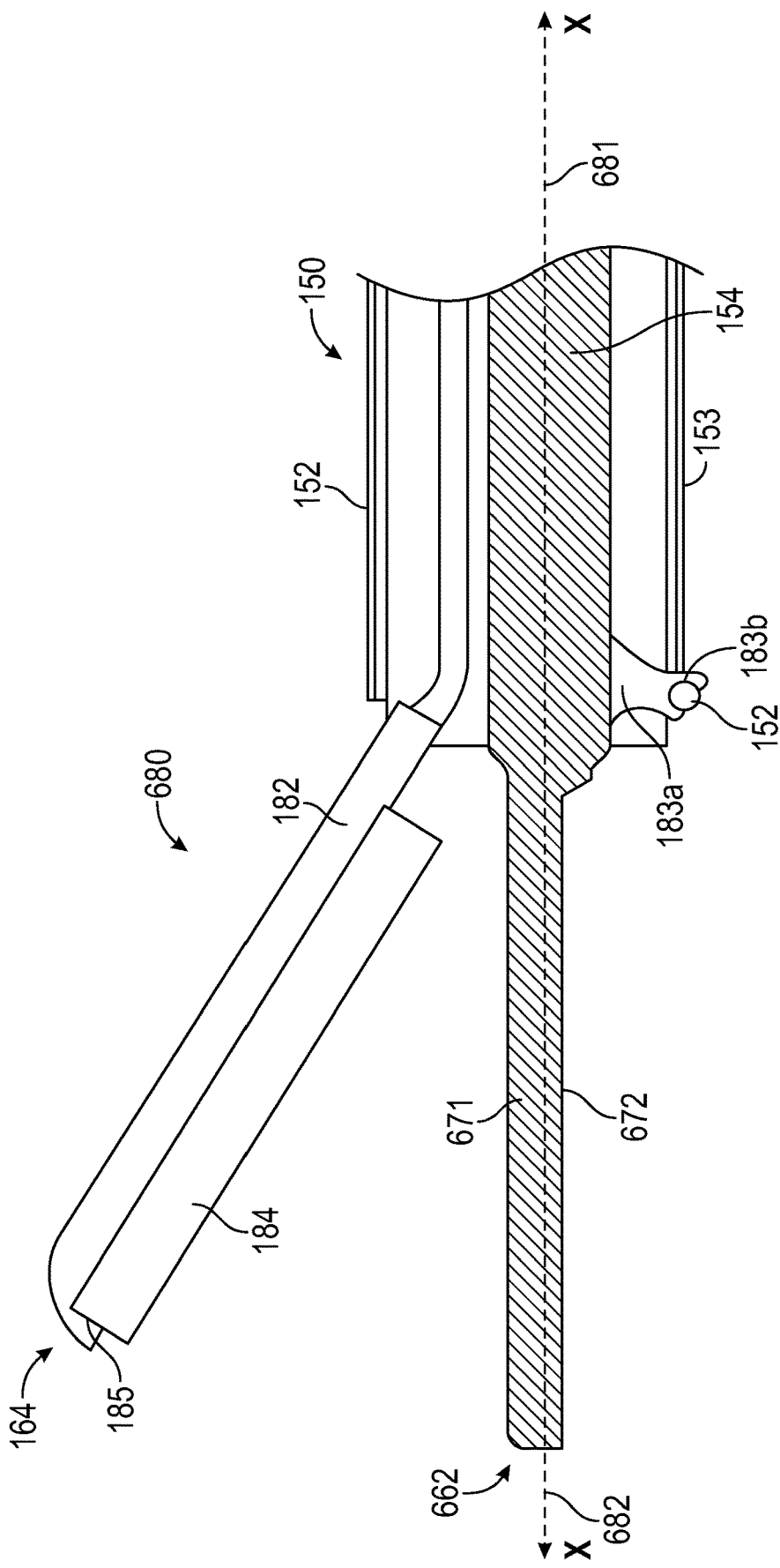
FIG. 6 is a longitudinal, cross-sectional view of an end effector assembly of a surgical instrument in accordance with the present disclosure and configured for use with the surgical systems of FIGS. 1-4C or any other suitable surgical system.
Figure 7:
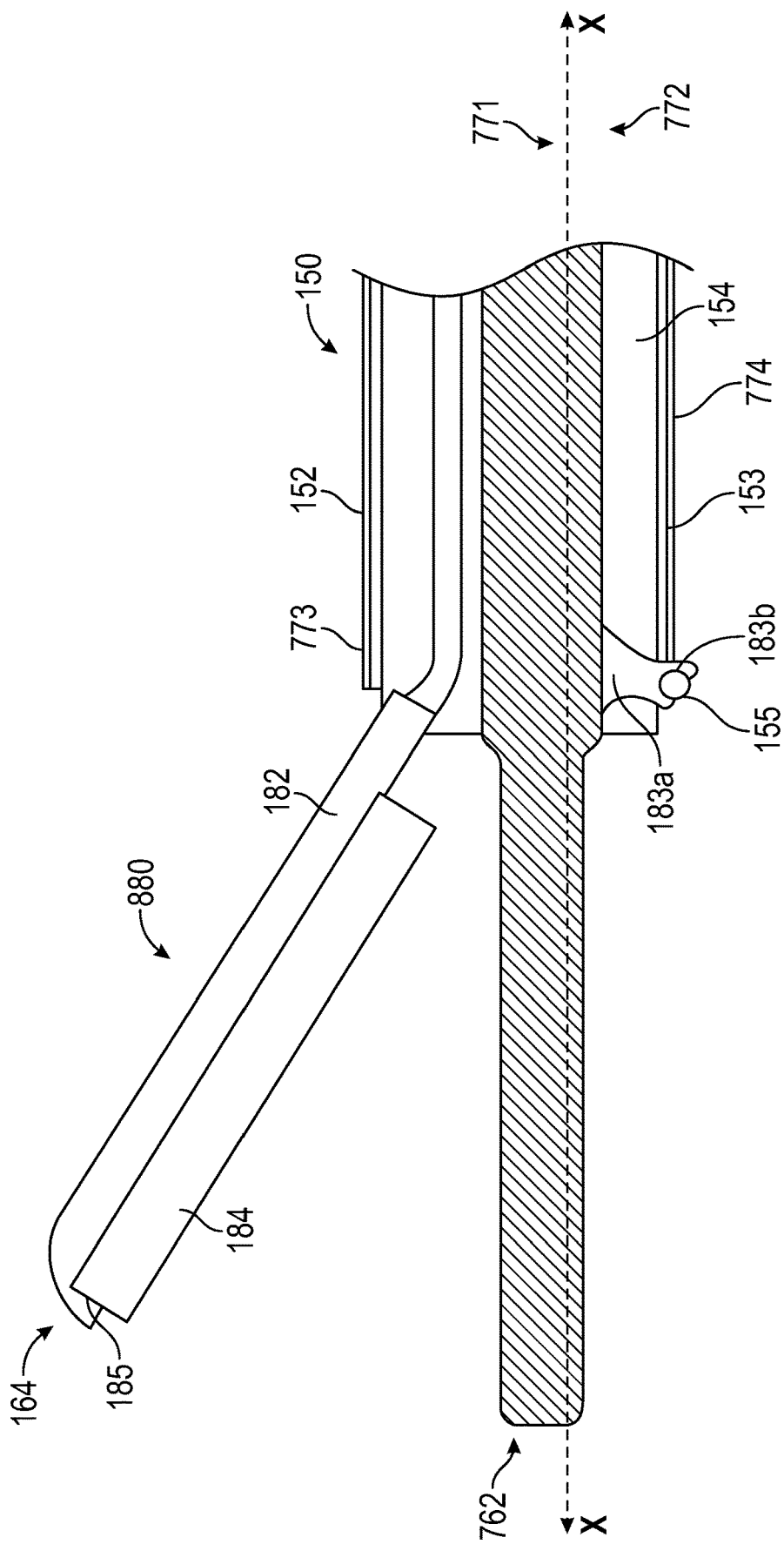
FIG. 7 is a longitudinal, cross-sectional view of an end effector assembly of another surgical instrument in accordance with the present disclosure and configured for use with the surgical systems of FIGS. 1-4C or any other suitable surgical system.

Referring generally to FIGS. 1, 6 and 7, blades 662 and 762 described below with reference to FIGS. 6 and 7 are substantially the same as blades 162, 782 (FIGS. 1 and 3A-3B) described herein, unless otherwise indicated, and thus duplicative descriptions are omitted below.

Jaw member 164 of end effector assembly 160 includes more rigid structural body 182 and more compliant jaw liner 184. Structural body 182 may be formed from an electrically conductive material, e.g., stainless steel, and/or may include electrically conductive portions. Structural body 182 includes a pair of proximal flanges 183a that are pivotably coupled to the inner support sleeve 153 via receipt of pivot bosses (not shown) of proximal flanges 183a within corresponding openings (not shown) defined within the inner support sleeve 153 and operably coupled with outer drive sleeve 152 via a drive pin 155 secured relative to outer drive sleeve 152 and pivotably received within apertures 183b defined within proximal flanges 183a. As such, sliding of outer drive sleeve 152 about inner support sleeve 153 pivots jaw member 164 relative to blades 662 or 762 from a spaced apart position to an approximated position to clamp tissue between jaw liner 184 of jaw member 164 and blades 662 or 762. As an alternative to a drive sleeve 152, a drive cable, rod, or other suitable actuation member may be engaged with drive pin 155 and slidable to actuation jaw member 164.

Referring particularly to FIG. 6, the waveguide 154 having blade 662 extending therefrom may define a longitudinal axis X-X along a central axis of the waveguide 154. The longitudinal axis X-X may include a proximal portion 681 and a distal portion 682. A shape of the blade 662 is asymmetric with respect to the waveguide 154 and, thus, with respect to the longitudinal axis X-X defined thereby. For example, blade 662 may include a first portion 671 on a first side of longitudinal axis X-X and a second portion 672 on a second side of the longitudinal axis X-X. The second portion 672 is narrower than the first portion 671 to form the asymmetric shape of blade 662 (wherein a portion of blade 662 is offset above longitudinal axis X-X towards jaw member 164). The asymmetric shape of blade 672 maximizes a visible area on the second side of blade 662, thus facilitating visualization during use. In aspects, rather than longitudinal axis X-X being defined through waveguide 154, longitudinal axis X-X may be defined through an ultrasonic horn (in configurations where waveguide 154 is omitted and blade 662 extends from the horn), or from a symmetric proximal neck disposed between blade 662 and waveguide 154 or blade 662 and the horn.

Referring particularly to FIG. 7, end effector assembly 880 defines a central axis X-X defining a first side 771 and a second side 772 of the central axis X-X. A position of the blade 762 is biased toward the first side 771 of the central axis X-X of the end effector 880. However, the blade 762 could similarly be biased toward the second side 772 of the central axis X-X. Biasing the blade 762 toward one side of the central axis X-X maximizes a visible area above or below blade 762, thus facilitating visualization.

As an example, the end effector 880 defines an upper side 773 and a lower side 774 (relative to the jaw member 164), and the blade 762 is offset toward the upper side 773 of the end effector assembly 880 (see, e.g., upward facing arrow in FIG. 7 indicating an offsetting direction of blade 762). However, as described herein, the blade 762 could similarly be biased toward the lower side 774 of end effector assembly 880. Blade 762 may be offset due to an offset of the waveguide 154 relative to the longitudinal axis X-X, via offset of an ultrasonic horn (in configurations where waveguide 154 is omitted and blade 762 extends from the horn), via offset of a proximal neck disposed between blade 762 and waveguide 154 or blade 762 and the horn. Further, in aspects, a blade of the present disclosure may include features of both blade 662 (FIG. 6) and blade 762 (FIG. 7); that is, where the blade is both asymmetric relative to and offset relative to the longitudinal axis X-X, in the same or different directions.

While several aspects of the disclosure have been detailed above and are shown in the drawings, it is not intended that the disclosure be limited thereto, as it is intended that the disclosure be as broad in scope as the art will allow and that the specification be read likewise. Therefore, the above description and accompanying drawings should not be construed as limiting, but merely as exemplifications of particular aspects. Those skilled in the art will envision other modifications within the scope and spirit of the claims appended hereto.

What is claimed is:

1. A surgical system, comprising;
   an elongated assembly;
   at least one articulation joint defined in the elongated assembly, the elongated assembly configured to articulate about the at least one articulation joint, the at least one articulation joint defining a central axis therethrough and a distal side portion;
   an offsetting member extending from the distal side portion of the articulation joint;
   an end effector supported by the offsetting member, the end effector including a blade and a jaw member movable relative to the blade between a spaced-apart position and an approximated position for clamping tissue therebetween, wherein the offsetting member is configured to offset the end effector with respect to the central axis of the at least one articulation joint; and
   an actuation cable extending through the at least one articulation joint, wherein the actuation cable is operably coupled to the jaw member to pivot the jaw member with respect to the blade between the spaced-apart position and the approximated position.

2. The surgical system of claim 1, wherein the elongated assembly defines a lumen, and wherein the actuation cable extends through the lumen of the elongated assembly.

3. The surgical system of claim 2, wherein the actuation cable extends along a central axis of the lumen.

4. The surgical system of claim 1, wherein the at least one articulation joint includes a housing and an ultrasonic transducer arranged in the housing, the ultrasonic transducer configured to transmit ultrasonic mechanical motion to the blade.

5. The surgical system of claim 4, wherein the housing is positioned on the distal side portion of the at least one articulation joint.

6. The surgical system of claim 4, further including an ultrasonic waveguide interconnecting the ultrasonic transducer with the blade, the ultrasonic waveguide extending through the offsetting member.

7. The surgical system of claim 1, further including a housing disposed at a distal side of the offsetting member and an ultrasonic transducer arranged in the housing, the ultrasonic transducer configured to transmit ultrasonic mechanical motion to the blade.

8. The surgical system of claim 1, wherein the jaw member or the blade is configured to connect to a source of electrosurgical energy for communicating electrosurgical energy to tissue clamped between the blade and the jaw member.

9. The surgical system of claim 1, wherein the end effector defines a central axis defining a first side and a second side of the central axis, and wherein a position of the blade is biased toward the first side or the second side of the central axis of the end effector.

10. A surgical system, comprising;
    an elongated assembly;
    at least one articulation joint defined in the elongated assembly, the elongated assembly configured to articulate about the at least one articulation joint;
    an offsetting member extending from a distal side portion of the articulation joint, wherein the offsetting member is configured to support and offset an end effector with respect to a central axis of the at least one articulation joint; and
    an ultrasonic waveguide interconnecting an ultrasonic transducer with a blade;
    wherein the end effector includes the blade and a jaw member movable relative to the blade between a spaced-apart position and an approximated position for clamping tissue therebetween, the waveguide defining a longitudinal axis, a first side portion of the blade on a first side of the longitudinal axis and a second side portion of the blade on a second side of the longitudinal axis, wherein a first thickness of the first side portion of the blade is thicker than a second thickness of the second side portion of the blade.

11. The surgical system of claim 10, wherein the ultrasonic waveguide extends through the offsetting member.

12. The surgical system of claim 11, wherein the at least one articulation joint includes a housing and the ultrasonic transducer arranged in the housing, the ultrasonic transducer configured to transmit ultrasonic mechanical motion to the blade.

13. The surgical system of claim 12, wherein the housing is positioned on a distal side portion of the at least one articulation joint.

14. A surgical system, comprising;
an elongated assembly;
at least one articulation joint defined in the elongated assembly, the elongated assembly configured to articulate about the at least one articulation joint; and
an offsetting member extending from a distal side portion of the articulation joint, wherein the offsetting member is configured to support and offset an end effector with respect to a central axis of the at least one articulation joint,
wherein the end effector includes a blade and a jaw member movable relative to the blade between a spaced-apart position and an approximated position for clamping tissue therebetween, the end effector defining a central axis, and
wherein the blade is offset with respect to the central axis of the end effector.

15. The surgical system of claim 14, further including an ultrasonic waveguide interconnecting an ultrasonic transducer with the blade.

16. The surgical system of claim 15, wherein the ultrasonic waveguide extends through the offsetting member.

17. The surgical system of claim 14, wherein the at least one articulation joint includes a housing and an ultrasonic transducer arranged in the housing, the ultrasonic transducer configured to transmit ultrasonic mechanical motion to the blade.

18. The surgical system of claim 17, wherein the housing is positioned on a distal side portion of the at least one articulation joint.

19. The surgical system of claim 14, wherein the jaw member or the blade is configured to connect to a source of electrosurgical energy for communicating electrosurgical energy to tissue clamped between the blade and the jaw member.

* * * * *